Feb. 18, 1941.    G. A. GILLEN    2,232,061
ELECTRICAL MACHINE
Filed Oct. 2, 1937    2 Sheets-Sheet 1
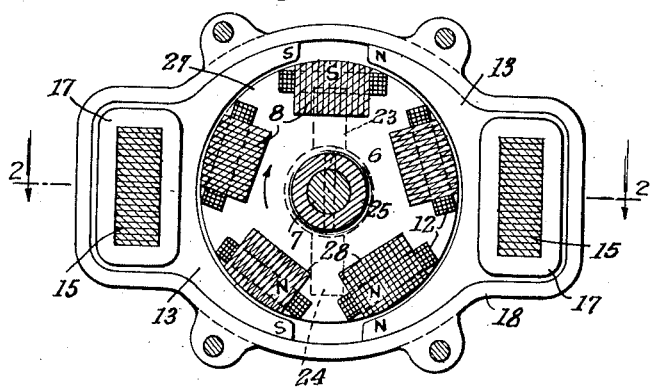
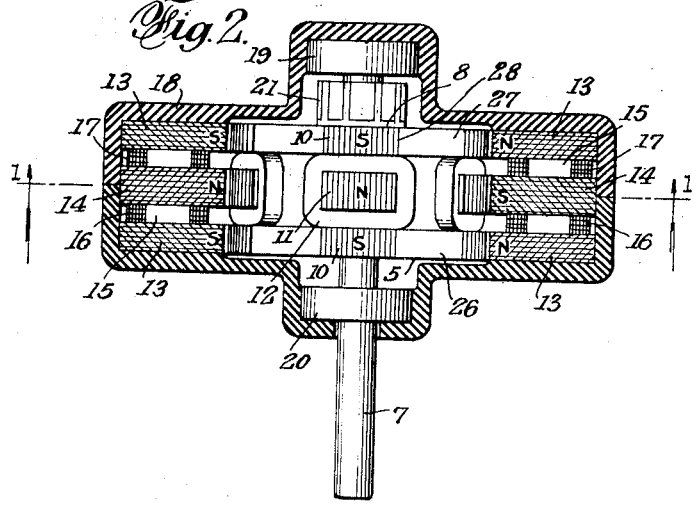
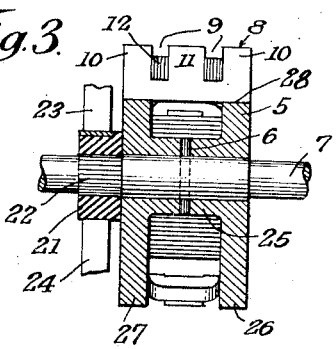
GEORGE A. GILLEN
INVENTOR
BY
ATTORNEY Feb. 18, 1941.  G. A. GILLEN  2,232,061
ELECTRICAL MACHINE
Filed Oct. 2, 1937  2 Sheets-Sheet 2
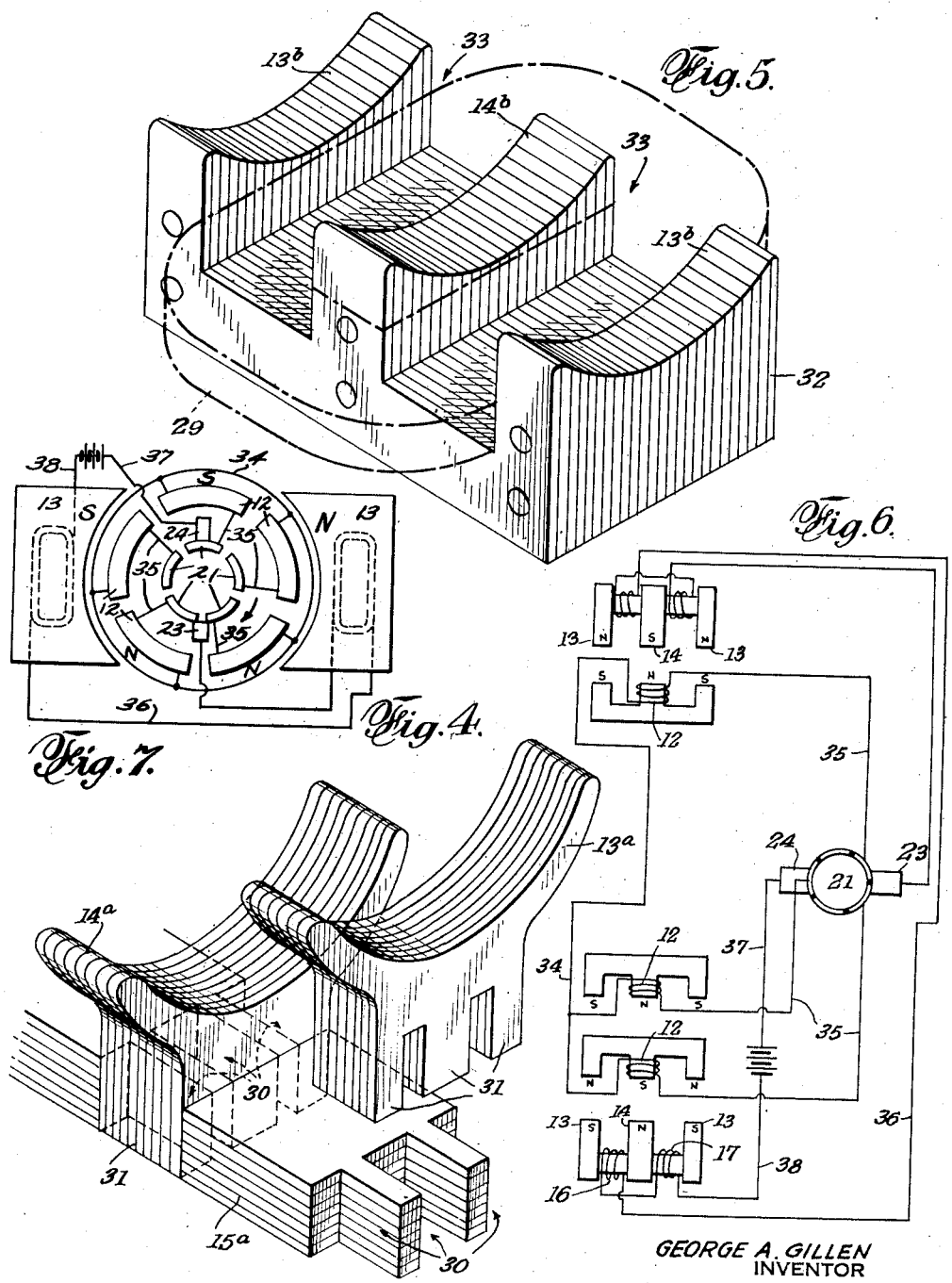
GEORGE A. GILLEN
INVENTOR Patented Feb. 18, 1941

2,232,061

UNITED STATES PATENT OFFICE 2,232,061

ELECTRICAL MACHINE

George A. Gillen, Bronx, N. Y.

Application October 2, 1937, Serial No. 166,922

2 Claims. (Cl. 172—36)

The invention herein disclosed relates to electric machines in the nature of motors and generators.

Special objects of the invention are to provide an electrical machine of this general type, which can be produced at low cost, readily assembled and which will be practical and efficient in every way.

These and other desirable objects and the novel features of construction, combinations and relations of parts by which the objects are attained are set forth and will appear in the course of the following specification.

The drawings accompanying and forming part of the specification illustrate some of the practical embodiments of the invention. The structure however, may be modified and changed as regards the present disclosure, all within the true intent and broad scope of the claims.

Fig. 1 is a transverse sectional view of a motor embodying the invention, this view being taken on a plane indicated by the section line 1—1 of Fig. 2.

Fig. 2 is a central horizontal sectional view as on line 2—2 of Fig. 1.

Fig. 3 is a broken cross-sectional detail of the armature.

Fig. 4 is a perspective view illustrating a modified method of building the laminated field magnet structure.

Fig. 5 is a perspective view illustrating another modification of the field construction.

Figs. 6 and 7 are wiring diagrams.

The armature or rotary element of the machine is shown as consisting of a non-magnetic spider or carrier 5, pinned at 6, or otherwise suitably secured on shaft 7, and carrying in its periphery the magnet cores 8, shown in the form of laminations disposed longitudinally of and parallel with the shaft. These magnet cores are slotted circumferentially of the armature at 9, providing in each instance two like end poles 10, and an intermediate consequent pole 11, unlike the end poles. The windings for effecting such polarization are shown as form wound coils 12, seated in slots 9. The field is shown as comprising opposed field magnets consisting each of two like end poles 13, and an intermediate unlike pole 14, magnetically connected by a core 15, with energizing windings 16, 17, about such core at opposite sides of the intermediate pole.

A split casing 18 is shown enclosing and supporting the field magnets and carrying the bearings 19, 20, for the armature shaft.

The commutator 21 is shown fixed on the armature shaft at one side of the spider 5, as by being forced over a ribbed or knurled portion 22 of that shaft. The brushes 23, 24, engaging this commutator are positioned and connected to effect the desired attraction and repulsion as between each set of three field poles and the correspondingly disposed three poles of the armature magnets. These magnets are faced off at the periphery of the armature as arcs of a common circle and similarly the field poles are concavely faced as arcs of a slightly larger concentric circle.

The armature body 5 may be molded plastic, die cast non-magnetic alloy or the like, and it may be shaped in the manner indicated in Fig. 3, with a shaft engaging sleeve portion 25, having spaced heads or flanges 26, 27, at the opposite ends of the same, slotted at 28, to form the seats for the magnet cores 8, and separated sufficiently to provide space for driving the intermediate securing pin 6.

Both field and armature cores, particularly for alternating current or universal motors may be of laminated construction, as indicated. These may be suitably secured in position as by molding or casting the supporting material thereabout. The coils may be of prewound form and be forced into the slots to receive the same, being pinned or otherwise suitably fastened in such slots. The structure is simple to manufacture, is easily assembled and locates the weight about the periphery of the armature, providing desirable running characteristics. The tripolar form of the magnets provides desirable starting torque and smooth even running characteristics.

Fig. 4 illustrates a form of the field magnet in which the core portion is formed of flat laminations 15a, slotted at 30, to receive corresponding tongues 31, on the back of the polar laminations 13a and 14a.

Fig. 5 shows how the field magnets may be made up of laminations 32, cross slotted at 33, to form the end and intermediate polar projections 13b, 14b, which are rounded off at their inner faces, substantially concentric to the armature. In this construction, only a single form wound coil 29, is necessary, placed in the slots 33, similar to the manner in which the coils 12 are located in the armature slots in the Fig. 1, 2, 3, construction.

While the armature cores are shown each slotted to form an intermediate and two end poles, it will be realized that these cores may be lengthened and slotted to form a greater number of poles, in which event, additional windings may be located in the additional slots. The mounting of the armature magnets in molded plastic is advantageous, particularly for binding in and permanently securing and supporting the lengthened cores used for the tripolar or greater poled forms of armature magnets.

Figs. 6 and 7 are circuit diagrams for a motor constructed as disclosed and in which it will be noted that the armature coils have a common connection 34, and individual connections 35, to the commutator segments. One brush 23 is shown connected with the field winding at the top in this view, which winding is connected at 36, in series with the oppositely polarizing winding at the bottom. The other brush 24 is connected at 37, with one side of the current supply and the other side of the current source is connected by 38 at the other side of the lower field winding. Fig. 7 shows how at the instant illustrated with brush 24, engaging the commutator segment at the top, the pole assembly at the top of the armature will be energized, producing S poles at the opposite ends of the armature and an intermediate N pole (as in Fig. 2) which are repelled by the similar poles at the left field magnet and attracted by the unlike poles at the right field magnet, while brush 23 bearing on the two bottom segments energizes the two lower pole assemblies to accomplish attraction at the left field magnet and repulsion at the right field magnet.

What is claimed is:

1. An electrical machine, comprising cooperating armature and field structures, said armature consisting of magnet cores extending longitudinally of the armature axis and slotted transversely of such axis to form in each instance two end poles and an intermediate pole and energizing windings disposed in said slots, said field comprising field magnets each having a core, two end poles and an intermediate pole in line with said end and intermediate poles of the armature, a winding on said field magnet core and commutator mechanism connected with said windings, including commutator segments and brushes engaged therewith, said brushes being connected with said field magnet windings in series relation, said armature windings being all connected together at one end and having the opposite ends of the same connected to individual commutator segments.

2. A combination as in claim 1, in which the field core is substantially straight and in which the intermediate and two end poles of the field magnet are interlockingly engaged over said substantially straight core.

GEORGE A. GILLEN.